United States Patent
Von Der Lippe et al.

(10) Patent No.: US 6,629,637 B1
(45) Date of Patent: Oct. 7, 2003

(54) METHOD AND DEVICE FOR DETERMINING THE POSITION OF A CHIP CARD IN A CARD READER

(75) Inventors: Carsten Von Der Lippe, Paderborn (DE); Lutz Neubauer, Wünnenberg-Leiberg (DE)

(73) Assignee: Wincor Nixdorf GmbH & Co. KG, Paderborn (DE)

(*) Notice: Subject to any disclaimer, the term of this patent is extended or adjusted under 35 U.S.C. 154(b) by 0 days.

(21) Appl. No.: 09/913,352
(22) PCT Filed: Feb. 10, 2000
(86) PCT No.: PCT/EP00/01083
§ 371 (c)(1), (2), (4) Date: Jan. 3, 2002
(87) PCT Pub. No.: WO00/51061
PCT Pub. Date: Aug. 31, 2000

(30) Foreign Application Priority Data

Feb. 25, 1999 (DE) .......................... 199 08 161

(51) Int. Cl.⁷ ............................................. G06K 7/08
(52) U.S. Cl. ......................................... 235/451
(58) Field of Search ................... 235/451, 386, 235/61.11 E; 439/633

(56) References Cited

U.S. PATENT DOCUMENTS 3,763,355 A  10/1973  Brand, Jr. ............ 235/61.11 E
5,668,365 A   9/1997  Ito et al. ..................... 235/846
6,461,196 B2 * 10/2002 Wilson et al. ............. 439/633

FOREIGN PATENT DOCUMENTS

FR  2 558 621     1/1984  .......... G06K/13/06
GB  2 095 397 A   9/1982  .......... G01B/7/04

* cited by examiner

Primary Examiner—Thien M. Le
Assistant Examiner—Lisa M. Caputo
(74) Attorney, Agent, or Firm—McCormick, Paulding & Huber LLP

(57) ABSTRACT

To determine the position of a chip card (14) in the card cage of a card reader the invention provides for the presence of the chip contact surface (18) to be detected in the four possible positions in which the chip (16) of the card (14) inserted into the card reader can be situated. To this end a sensor (20) for detecting the chip card surface (18) and linked to an evaluation unit (28) is arranged opposite each of the possible positions.

17 Claims, 2 Drawing Sheets

METHOD AND DEVICE FOR DETERMINING THE POSITION OF A CHIP CARD IN A CARD READER

CROSS-REFERENCE TO RELATED APPLICATIONS

This application is related to International Application No. PCT/EPOO/01803 filed Feb. 10, 2000 and German patent application No. DE 199 08 161.1 filed Feb. 25, 1999, both of which are entitled "METHOD AND DEVICE FOR DETERMINING THE POSITION OF A CHIP CARD IN A CARD READER". Applicant claims priority of both of the above-identified applications.

FIELD OF THE INVENTION

The invention concerns a method for determining the position of a chip card in a card reading device, in cases where the chip is arranged eccentrically in the card, as well as a device for carrying out such a method.

BACKGROUND OF THE INVENTION

If a chip card of a type conventional today, which has no magnetic readable strip or whose magnetic readable strip is not written on, is inserted into a card reader with a chip card contact station, the chip card can take four different orientations relative to the chip contact station. Nevertheless, only one orientation leads to a successful contacting of the chip, since the chip card contact station can only make contact with one area of the chip card. Since the user generally cannot determine where the contact elements of the reader are located, he often must make several insertion attempts, until he finds out in which orientation he has to insert the chip card into the card reader to assure a successful contacting.

In the case of cards with a magnet strip it is already known to provide means for predetermining the magnetic track. Thereby insertion of non-standard objects and especially a manipulation of the reading device is inhibited. With this magnet track pre-recognition, it can further be determined among other things that the actual insertion orientation of the card is not correct. It cannot however be determined in which orientation the card is actually located and how the user must change the orientation of the card in order to make possible a chip card contacting.

SUMMARY OF THE INVENTION

The invention has as its basic object the provision of a method of the aforementioned kind in which the actual orientation of a card can be determined and as the case may be, it can decided in which way the orientation of the card has to be changed in order to correctly insert it into the card reader.

The above object is solved in accordance with the invention in that at the four possible positions which a chip of a chip card inserted into the card reading device can take, the presence of the chip contact surface is determined.

With the method of the invention it is therefore not only determined that a card has been inserted falsely orientated into the card reader but it is also determined in which orientation the chip is actually located. Therefore, it is possible to indicate the orientation of the chip and/or of the chip card and to give the user a report on how the user is to correctly insert the card. Further there exists the possibility of so changing the position of the card or the position of the contact elements of the reader that a correct contacting of the chip is possible.

The presence of the chip contact surface can be determined inductively, capacitively or by a resistance measurement through direct contacting of the chip contact surface.

For the carrying out of the previously described method an apparatus is proposed for determining the orientation of a chip card in the card receiver of a card reader by having a sensor located opposite each of the four possible positions which the chip can take when the card is inserted into the card reader to a test position, with each of the sensors being capable of determining the presence of the chip contact surface and being connected with an evaluation circuit. The test position can correspond to the card reading position.

In a first embodiment, the sensors are each formed to provide an inductive recognition of the presence of the chip contact surface. In this case each sensor can include a pair of coils with one coil being a transmitting coil located on one side of the chip card receiver and with the other coil being a detecting coil located on the other side of the chip card receiver, which two coils are connected to one another so as to be in series resonance with respect to an exciting frequency. The alternating voltage applied to the involved transmission coil induces an alternating voltage across the detection coil. If now the chip contact surface comes between such a coil pair it reduces for that sensor the value of the detected alternating voltage. By comparison of the values detected by the four sensors it can be determined at which of the sensors the chip contact surface lies. Therefore, the orientation of the chip card in the card receiver can be clearly determined.

In another embodiment, the sensors are each formed to provide a resistance measurement. This can be accomplished in that each sensor has a pair of contact pins which are adjustable in the direction toward the chip card so that the contact pins can be brought into galvanic contact with the chip contact surface. The resistance values determined at the four positions are again compared with one another in the evaluation circuit in order to identify the position of the chip and thereby the orientation of the chip card.

Finally there exists the possibility that the sensors can each be formed to carry out a capacitative recognition of the presence of the chip contact surface, in which case for example each sensor has a capacitor with capacitor surfaces arranged on opposite sides of the card receiver. If now the chip card is inserted between the capacitor plates, the capacitance of the involved capacitor is changed by the inserted card material. At the position of the chip contact surface this change is, however, the highest.

Advantageously, the evaluation circuit is connected with an indicator device to indicate to the user the orientation of the card or the measures needed to be taken to bring the card into its correct orientation.

As the case may be, the evaluation circuit can also be connected with a position correcting device in order to either change the position of the card in the card receiver or the position of the contact elements relative to the card in dependence on the results reported by the sensors.

Further features and advantages of the invention will be apparent from the following description which in connection with the accompanying drawings explain the invention by way of exemplary embodiments. The drawings are:

DETAILED DESCRIPTION OF THE INVENTION

Figure 1:
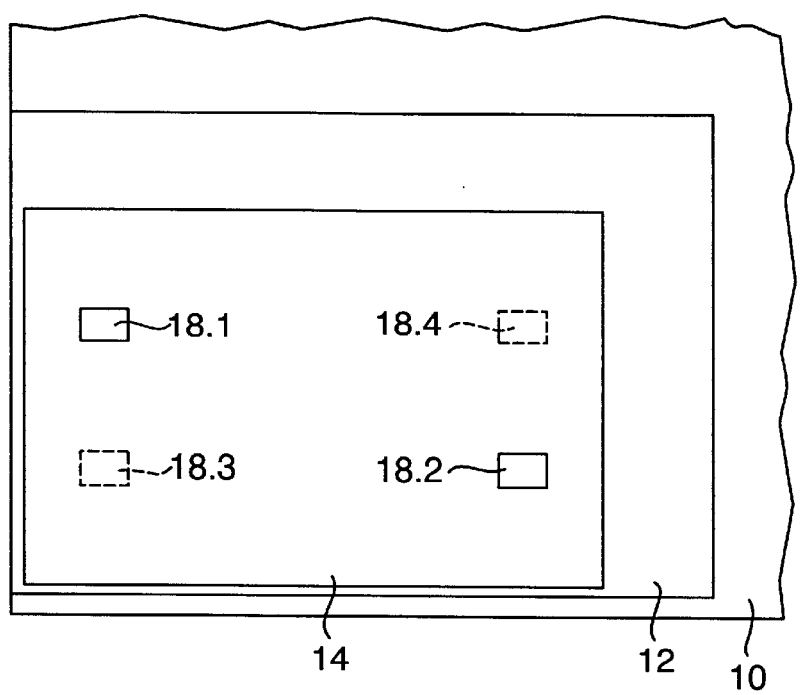
FIG. 1, a schematic plan view of one side of a chip card located in a card receiver of a card reader, FIG. 2, a schematic representation of a device for inductively determining the card orientation, FIG. 3, a schematic representation of the sensor arrangement for determining the card orientation by resistance measurements, and FIG. 4, a representation corresponding to FIG. 3 of a sensor arrangement for capacitively determining the card orientation.

In FIG. 1, the reference number 10 indicates a device, not further illustrated in detail, having a receiving compartment 12, for a chip card 14. Embedded in the chip card 14 is a processor or memory component, that is a chip 16 (FIGS. 2–4), which by means of a chip contact surface 18 arranged on one of the exterior sides of the card can come into contact with non-illustrated opposing contacts of the device located in the card receiver 12, if the chip card 14 is received in the receiver 12. In most instances, the position of the chip is the same as the position of the chip contact surface, since the chip is advantageously arranged below the chip contact surface.

According to ISO 7816-1 the chip contact surface 18 can take four positions with respect to the chip card 14, which positions are schematically illustrated in FIG. 1 and designated by reference numbers 18.1 to 18.4. The positions 18.1 and 18.2 thereby are located on the side of the chip card facing the observer, while the positions 18.3 and 18.4 illustrated with dashed lines are located on the side of the chip card facing away from the observer. One of these four positions is associated with the opposing contacts of the reading device 10. By a turning of the card about an axis perpendicular to its middle axis or by clapping it about its longitudinal and/or transverse axes the positions 18.1, 18.2 can be transferred to the positions 18.3, 18.4 and vice versa.

As a rule, the user does not know at which of the four positions the opposing contacts of the card reading device 10 are arranged, that is in what way he must insert the chip card 14 into the card receiver 12 in order to achieve a contact between the chip contact surface 18 and the opposing contact elements of the card reading device 10. If clear instructions are not given on the device as to in what orientation the chip card 14 has to be inserted into the card receiver 12, a high probability exists that the user will at first insert the card into the card receiver 12 in a false position. The arrangement illustrated in FIGS. 2–4 permits the orientation of the inserted chip card 14 to be correctly recognized, and as the case may be to be quickly corrected in order to avoid a number of false insertions.

Figure 2:
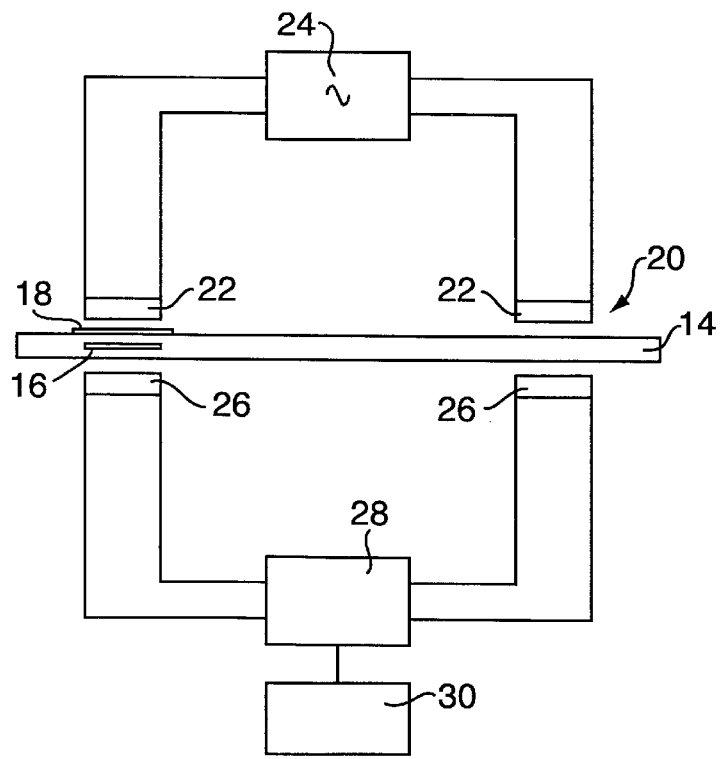

FIG. 2 shows a sensor arrangement for inductively determining the position of the chip contact surface 18. This sensor arrangement has four sensors indicated generally at 20, of which in FIG. 2 only two sensors are seen, since the other two are hidden. Each sensor has a transmitting coil 22, which is connected with a source 24 of alternating voltage. Associated with the transmitting coil 22 is a receiving coil 26, which is connected with an evaluating unit 28. The evaluating unit is in turn connected with an indicating device 30.

The transmitting coil 22 and the receiving coil 26 are in series resonance with respect to the frequency of the exciting voltage. The alternating voltage applied to the transmitting coil 22 induces likewise across the receiving coil 26 an alternating voltage. If now the chip contact surface 18 is between such a coil pair 22,26 the value of the alternating voltage across the receiving coil 26 is lowered. This voltage value change is amplified by an operational amplifier in the evaluation unit 28 and by comparison with the signals obtained from the other sensors 20 is recognized and evaluated. Therefore it is possible to clearly recognize the position at which the chip 16 is located and thereby also the orientation of the chip card 14 in the receiver 12. This orientation can be indicated by the indicating unit 30. At the same time or alternatively thereto the indicating unit 30 can also give information to the user as to how the orientation of the card must be changed in order to bring the chip contact surface 18 into contact with the opposing contact elements of the card receiver 12.

The testing of the orientation of the card 14 in the card receiver 12 can take place at the effective contact position of the card or also at a desired test position inside of the card receiver which is displaced in respect to the effective contact position. It is to be noted that the necessary value testing of the four coil pairs or sensors 20 should not occur until stopping of the movement of the chip card 14, since for example metalized holograms, which are often provided on chip cards, during movement of the card can likewise-lead to voltage disturbances.

Figure 3:
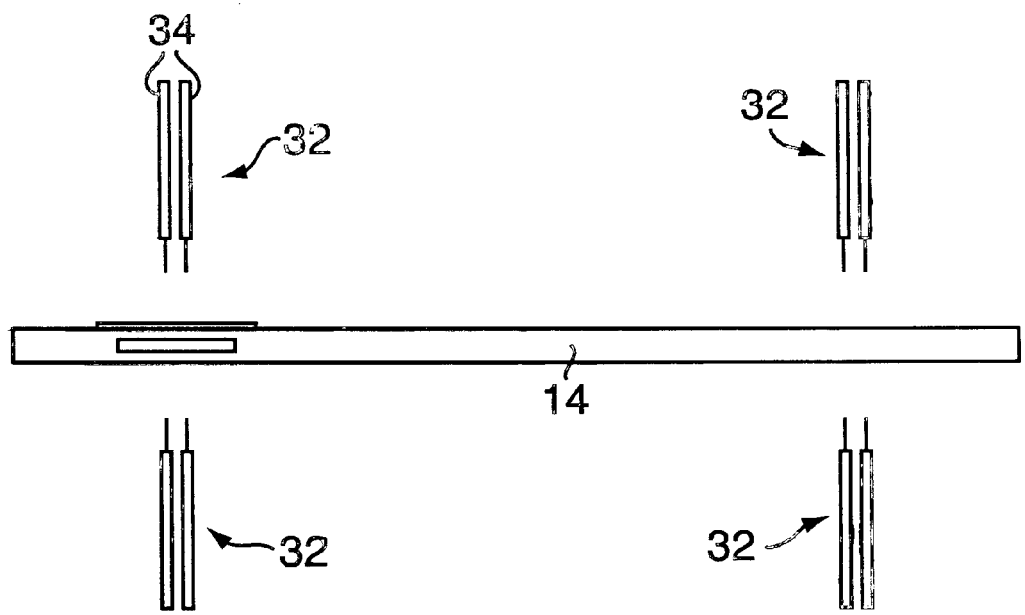

FIG. 3 shows a modified embodiment in which a sensor 32 is arranged at each of the positions 18.1 to 18.4, which sensor 32 consists of two contact pins or sensing points 34 connected with one another through a non-illustrated resistance measuring circuit. These pins or points can be moved in the direction toward the chip card 14, that is in FIG. 3 moved up or down. Upon the contact pins 34 coming in contact with the plastic material of the chip card, a high resistance value is reported. If the contact pins 34 encounter the metallic chip contact surface 18 a lower measured resistance value is obtained. This resistance value is determined by the gold plated surface and therefore can be distinguished for example from the resistance value of a metalized hologram. By means of a comparison of the resistance values obtained from the four sensors 32 again a clear position of the chip contact surface 18 and of the chip 16 can be determined and evaluated.

Figure 4:

Finally, FIG. 4 shows a sensor arrangement for a capacitive recognition of position of the chip 16 and of the chip card 14. In this arrangement a sensor 36 is again arranged at each of the positions 18.1 to 18.4, of which only two are illustrated in FIG. 4. Each sensor 36 represents a capacitor with two electrodes 38 which are located on opposite sides of the chip card 14. By the insertion of the chip card between the electrodes 38 of the sensors 36 the dielectric value is changed and thereby also the capacitance of the sensors 36. At the position at which the chip contact surface 18 is located this change is the highest. By comparison with the other sensors again the position of the chip 16 can be determined and indicated on the indicating device 30. Also in this embodiment care is to be taken in that a capacitance change arising from metalized holograms is also recognized.

LIST OF REFERENCE NUMBERS

| | |
|---|---|
| 10 | Card reading device |
| 12 | Receiving compartment |
| 14 | Chip card |
| 16 | Chip |
| 18 | Chip contact surface |
| 18.1–18.4 | Chip positions |
| 20 | Sensor |
| 22 | Transmitting coil |
| 24 | Alternating voltage source |

-continued

| | |
|---|---|
| 26 | Detection coil |
| 28 | Evaluation unit |
| 30 | Indicating unit |
| 32 | Sensor |
| 34 | Contact pins |
| 36 | Sensor |
| 38 | Electrodes |

What is claimed is:

1. A method for determining an orientation of a chip card (14) in a card receiver (12) of a card reader (10), wherein a chip contact surface (18) is arranged eccentrically on the card (14), characterized in that at four possible positions (18.1–18.4) which the chip card contact surface (18) of a card (14) inserted into the card receiver (12) can be located, the presence of the chip contact surface (18) is determined.

2. The method according to claim 1, further characterized in that the presence of the chip contact surface (18) is inductively determined.

3. The method according to claim 1, further characterized in that the presence of the chip contact surface (18) is capacitively determined.

4. The method according to claim 1, further characterized in that the presence of the chip contact surface (18) is determined by a resistance measurement.

5. The method according to claim 1, further characterized in that the position of the chip contact surface (18) and/or the orientation of the chip card (14) is indicated.

6. The method according to claim 1, further characterized in that the position of the chip card (14) in the card receiver (12) is automatically corrected.

7. The method according to claim 1, further characterized in that the chip contact elements of the card reader (10) are adjusted to the actual position of the chip card (14) in dependence on the determined chip position.

8. An apparatus for determining a position of a chip card (14) in a card receiver (12) of a card reader (10), wherein a chip contact surface (18) is arranged eccentrically on the card (14), characterized in that opposite each of the possible four positions (18.1–18.4) which the chip contact surface (18) of a card (14) inserted into the card reader (10) to a test position can be located is a sensor (20, 32, 36) for determining the chip contact surface (18) and connected with an evaluation unit (28).

9. The apparatus according to claim 8, further characterized in that the test position is the card reading position.

10. The apparatus according to claim 8, further characterized in that the sensors (20) are each formed to provide an inductive recognition of the presence of the chip contact surface (18).

11. The apparatus according to claim 10, further characterized in that each sensor (20) includes a coil pair with one coil being a transmitting coil (22) located on one side of the card receiver (12) and with the other coil being a detecting coil (24) located on the other side of the card receiver (12), which coils are in series resonance with respect to an exciting frequency.

12. The apparatus according to claim 8, further characterized in that the sensors (32) are each formed to make a resistance measurement.

13. The apparatus of claim 12, further characterized in that each sensor (32) has a contact pin pair (34) which are adjustable in the direction toward the card (14) so that the contact pins (34) can be brought into galvanic connection with the chip contact surface (18).

14. The apparatus according to claim 8, further characterized in that the sensors (36) are each formed to provide a capacitive recognition of the presence of the chip contact surface (18).

15. The apparatus according to claim 14, further characterized in that each sensor (36) has a condenser with condenser surfaces (38) arranged on both sides of the card receiver (12).

16. The apparatus according to claim 8, further characterized in that the evaluation unit (28) is connected with an indicating device (30).

17. The apparatus according to claim 8, further characterized in that the evaluation unit (28) is connected with a position correcting device.

* * * * *